United States Patent
Nirwal et al.

(10) Patent No.: US 10,686,755 B2
(45) Date of Patent: Jun. 16, 2020

(54) ASSIGNING IP ADDRESSES AND CONFIGURATION PARAMETERS IN HYPER-CONVERGED INFRASTRUCTURE

(71) Applicant: VMWARE, INC., Palo Alto, CA (US)

(72) Inventors: Vishesh Kumar Nirwal, Bangalore (IN); Suket Gakhar, Bangalore (IN)

(73) Assignee: VMWare, Inc., Palo Alto, CA (US)

( * ) Notice: Subject to any disclaimer, the term of this patent is extended or adjusted under 35 U.S.C. 154(b) by 280 days.

(21) Appl. No.: 15/688,938

(22) Filed: Aug. 29, 2017

(65) Prior Publication Data
US 2019/0007369 A1    Jan. 3, 2019

(30) Foreign Application Priority Data
Jun. 29, 2017 (IN) .............................. 201741022796

(51) Int. Cl.
 G06F 15/16  (2006.01)
 H04L 29/12  (2006.01)
 H04L 12/24  (2006.01)
 G06F 9/455  (2018.01)

(52) U.S. Cl.
 CPC ...... *H04L 61/2015* (2013.01); *G06F 9/45558* (2013.01); *H04L 41/08* (2013.01); *H04L 41/0806* (2013.01); *H04L 61/103* (2013.01); *G06F 2009/45579* (2013.01); *G06F 2009/45595* (2013.01); *H04L 41/22* (2013.01); *H04L 61/6022* (2013.01)

(58) Field of Classification Search
 CPC . H04L 61/2015; H04L 41/08; H04L 41/0806; H04L 61/103; G06F 9/45558
 USPC ................................................. 709/220, 222
 See application file for complete search history.

(56) References Cited

U.S. PATENT DOCUMENTS

| | | | |
|---|---|---|---|
| 8,832,007 B2 * | 9/2014 | Nahum | H04L 41/0886 706/12 |
| 2010/0191813 A1 * | 7/2010 | Gandhewar | H04L 61/2015 709/206 |
| 2015/0215430 A1 * | 7/2015 | Votour | H04L 61/2015 709/220 |

* cited by examiner

*Primary Examiner* — David R Lazaro
*Assistant Examiner* — Mariegeorges A Henry
(74) *Attorney, Agent, or Firm* — Thomas|Horstemeyer, LLP (57) ABSTRACT

Disclosed are various examples for improving the performance of an imaging service that can assign an IP address. The imaging service can implement the DHCP protocol and assign other configuration parameters using the DHCP protocol. An IP address cache can also be employed to speed a subsequent IP address assignment by the imaging service.

17 Claims, 5 Drawing Sheets

ASSIGNING IP ADDRESSES AND CONFIGURATION PARAMETERS IN HYPER-CONVERGED INFRASTRUCTURE

RELATED APPLICATION

Benefit is claimed under 35 U.S.C. 119(a)-(d) to Foreign Application Ser. No. 201741022796 filed in India entitled "ASSIGNING IP ADDRESSES AND CONFIGURATION PARAMETERS IN HYPER-CONVERGED INFRASTRUCTURE", filed on Jun. 29, 2017 by VMware, Inc., which is herein incorporated in its entirety by reference for all purposes.

BACKGROUND

Hyper-converged infrastructure (HCI) is a type of virtual computing platform that converges compute, networking, virtualization, and storage into a single software-defined architecture. For instance, a single software application can interact with each component of hardware and software as well as an underlying operating system. Hyper-converged infrastructures provide enterprises and other organizations with modular and expandable compute, storage, and network resources as well as system backup and recovery. In a hyper-converged infrastructure, compute, storage, and network resources are brought together using preconfigured and integrated hardware.

HCI can be deployed within a physical rack that contains one or more network switches, servers, and other hardware that facilitates communication between the servers and between the servers in the rack and external networks. When a rack is deployed, a dynamic host configuration protocol (DHCP) server or server process can be executed within one of the machines in the rack to assign internet protocol (IP) addresses to the other hardware in the rack as well as provide other configuration parameters, such as network boot parameters. A DHCP request that is received from a DHCP client can have various identifying information that a DHCP server processes in order to assign an IP address in the correct IP address range. The processing of the identifying information can require computational resources of the DHCP server and also delay the response time for a DHCP client.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to device replacement in hyper-converged infrastructure (HCI) computing environments. Hyper-converged computing environments can include many computing devices or servers, which are also referred to as "nodes" or "hosts," which can be in communication over network connections. Over time, hyper-converged infrastructure services can facilitate various configurations of a server, such as executing multiple virtual machines within a given physical server. In some implementations of a hyper-converged environment, one or more physical servers or computing devices are installed in a rack and connected to a rack switch to facilitate communication between the servers. The rack switch can also be connected to a network that allows the servers to communicate with other servers that are installed in other racks.

HCI can be deployed by configuring a rack 112 with various physical servers that are setup to configure or image themselves into an initial configuration. In one example, the physical servers 115 within the rack can be configured to network boot and request boot parameters from a dynamic host configuration protocol (DHCP) server, which can provide an IP address to the physical server 115 as well as pre-boot execution (PXE) parameters that are supported by the DHCP protocol. PXE parameters allow a DHCP server to provide instructions to a DHCP client to download and potentially boot or execute a network boot program that further images or configures the physical server 115. The network boot program can install various software and configure various parameters on the physical server 115. For example, the network boot program can control the boot experience on the physical server 115 and configure the server 115 for an extended boot. The network boot program can then hand control of the physical server over to an operating system or operating system kernel.

In some implementations, an HCI rack 112 can be configured with one machine or appliance that runs an imaging service 130. The imaging service 130 represents a server process or network-accessible service that provides DHCP server functionality to assign IP addresses to the other physical servers 115 within a rack 112. In some implementations, the imaging service 130 can also install the appropriate applications, policies, and configuration files for the various servers 115 within a particular rack 112. For example, the imaging service 130 can install hypervisor software or a virtual machine environment on which virtual machines can be run on a physical server 115. As another example, the imaging service 110 can install applications that are executed by a physical server 115 to facilitate execution of the HCI.

Accordingly, a designer of an HCI or a rack 112 might wish for switches 118 and certain servers 115 within the rack 112 and/or virtual machines executed by certain server 115 within the rack to be assigned a particular IP address from a particular IP address range. The physical and virtual machines that require an IP address assignment from the DHCP server functionality of the imaging service 130 can be thought of as DHCP clients 133. For example, a network switch 118, or a management component of the switch 118, might be assigned an IP address from a particular range of IP addresses that is different from an IP address range that is assigned to physical server 115. A virtual machine that is executed on one of the physical servers 115 might be assigned an IP address from different IP address range than a physical server 115.

Additionally, the various types of DHCP clients 133 might also be configured with various other DHCP optional parameters, such as a next server parameter, a trivial file transfer protocol (TFTP) parameter, a pre-execution environment (PXE) parameter, or other DHCP or advanced DHCP parameters that can facilitate configuration of a physical or virtual machine within the rack 112.

Evaluating which IP address to assign to a particular physical or virtual machine within a rack 112 can take into account vendor identifying information that is embedded within a DHCP broadcast message that is broadcast by a DHCP client 133 on a network to which it is connected. The DHCP broadcast message can include a vendor class identifier that identifies the class or category of machine that corresponds to the DHCP client 133. The imaging service 130 can maintain IP address assignment logic that is executed whenever a DHCP broadcast message is received from a DHCP client 133. The IP address assignment logic can assign an IP address by determining an IP address pool or range that is assigned to a particular vendor class identifier. The IP address assignment logic can also identify additional parameters that can be provided to a DHCP client 133 that are specified by a designer of the rack 112.

The IP address assignment logic can require computational resources of the server 115 executing the imaging service 130 and can also cause a delay in assignment of the address to a DHCP client 133 that is requesting the IP address. In practice, once a rack 112 has been configured a first time by the imaging service 130, subsequent DHCP requests from DHCP clients 133 can be responded to by assigning the same IP address and/or the same configuration parameters that were previously assigned to the DHCP client 133. Therefore, the IP address assignment logic need only be executed once. Accordingly, embodiments of this disclosure can yield an improved performance of a DHCP server as well as applications such as the imaging service 130 by speeding up the response time for subsequent DHCP requests 135 after an initial request from a DHCP client 133 is processed and an IP address assignment has been made.

Figure 1:
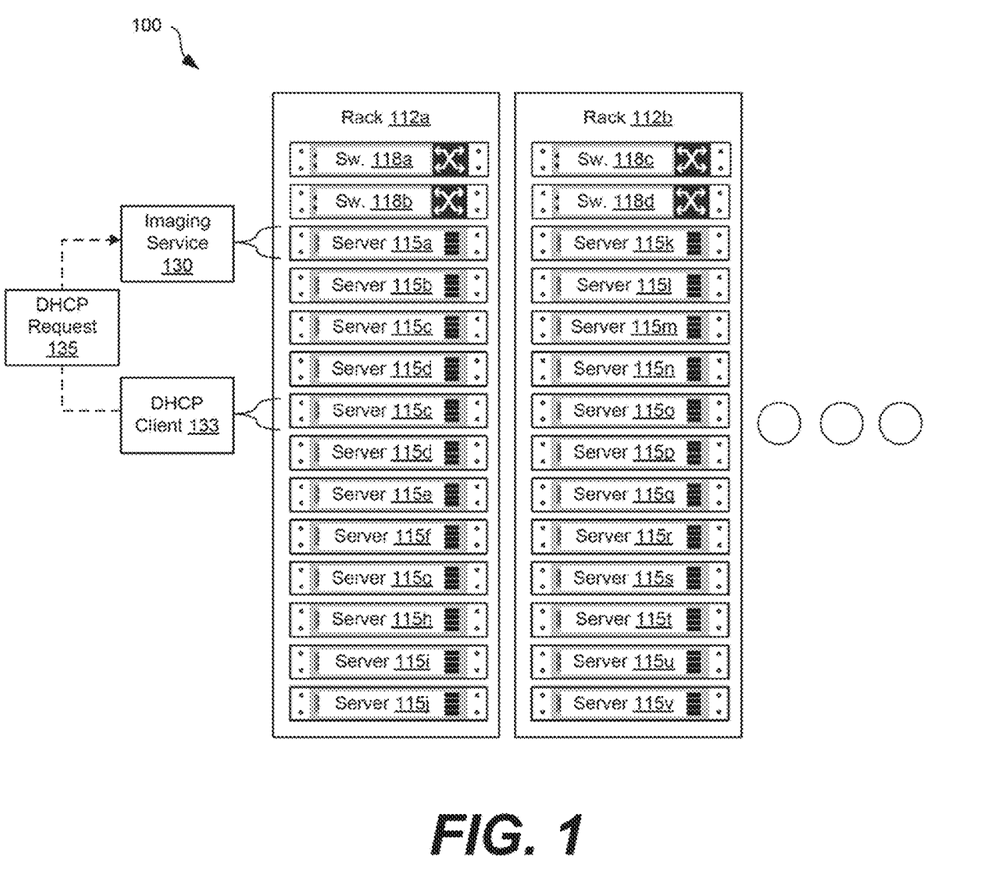
FIG. 1 is a drawing of an example of a hyper-converged computing environment.

With reference to FIG. 1, an example of a HCI computing environment 100 is shown. The HCI computing environment 100 can include physical servers 115 and optionally one or more network switches 118 that are positioned in racks 112. The racks 112 can be installed within a data center environment and be in communication over a distributed geographically and connected to one another through a local area or wide area network.

The devices in the racks 112 can include, for example, memory and storage devices, servers, central processing units (CPUs), graphics processing units (GPUs), switches, power supplies, and networking cables or other interconnects. The devices, such as servers, can have dimensions suitable for quick installation in slots within the racks. In various examples, the servers can include requisite physical hardware and software to create and manage a virtualization infrastructure. The physical hardware for a server can include a CPU, GPU data bus, memory, and other components. The servers can include a preconfigured hyper-converged computing device where a hyper-converged computing device includes pre-tested, preconfigured, and pre-integrated storage, server and network components, including software, that are positioned in an enclosure installed in a slot on a rack.

Additionally, each server 115 in a rack 112 can execute a hypervisor. In some examples, a hypervisor can be installed on a server 115 to support a virtual machine execution space within which one or more virtual machines (VMs) can be instantiated and executed. In some examples, the hypervisor can include VMware ESX™ hypervisor or a VMware ESXi™ hypervisor. The various racks 112 can be installed in a data center and connected via a network so that an imaging service 130 executed in one rack 112a can potentially serve machines that are installed in a separate rack 112b.

Figure 2:
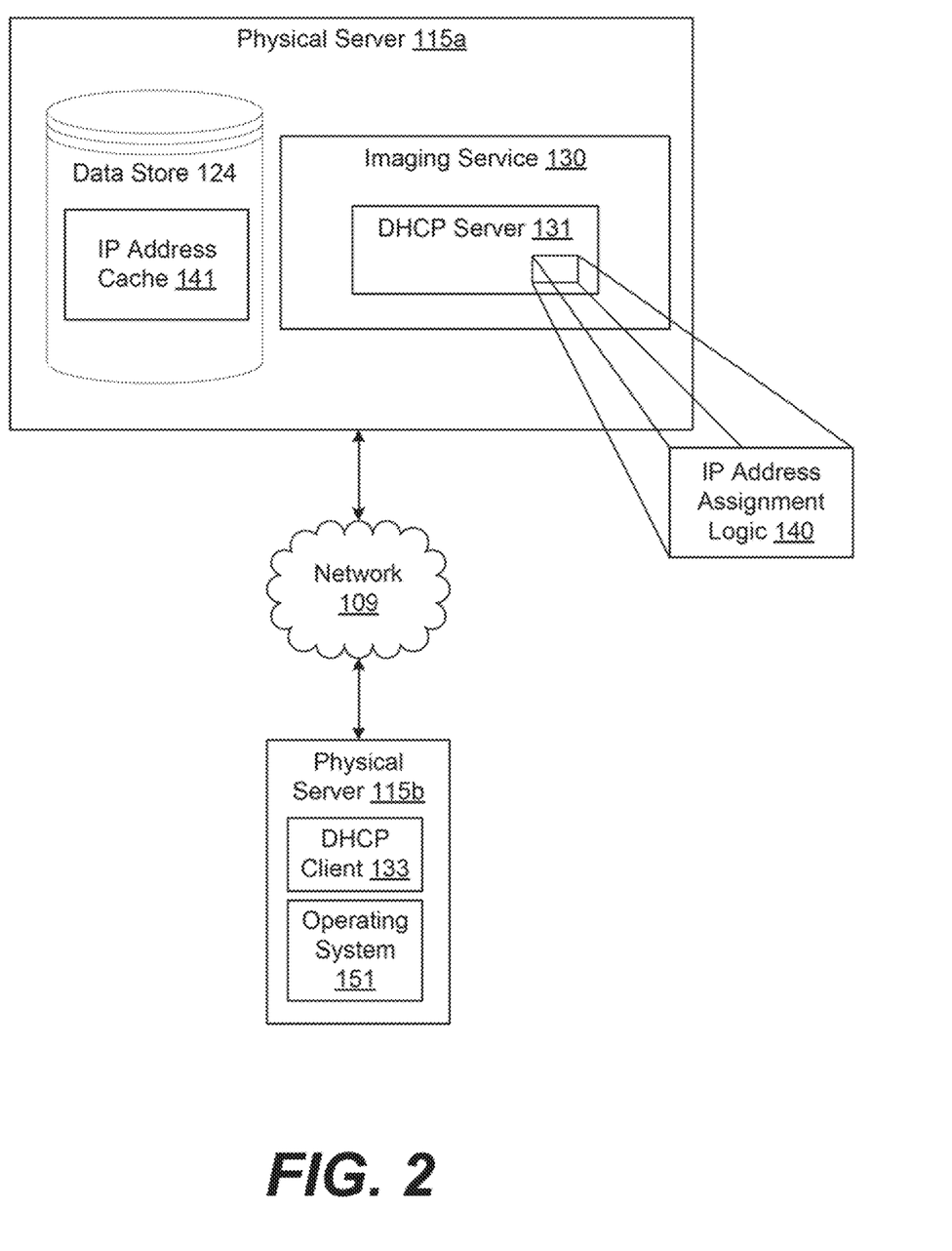
FIG. 2 is a drawing of another example of a hyper-converged computing environment.

Referring next to FIG. 2, shown is an alternative drawing of the HCI computing environment 100 shown in FIG. 1. In the drawing of FIG. 2, two physical servers 115a and 115b are depicted. The physical servers 115a and 115b can also be replaced in the drawing with virtual machines that are executed on one or more physical servers 115 in the HCI computing environment 100. The depiction of FIG. 2 shows a first physical server 115a executing the imaging service 130 in communication with another physical server 115b that are in communication over a network 109.

The network 109 can include, for example, the Internet, intranets, extranets, wide area networks (WANs) local area networks (LANs), wired networks, wireless networks, other suitable networks, or any combination of two or more such networks. For example, the networks can include satellite networks, cable networks, Ethernet networks, telephony networks, and other types of networks.

As noted above, a HCI computing environment 100 can include one or more racks 112. In various embodiments, the HCI computing environment 100 can include a plurality of devices installed in racks within a data center or a server room. For example, the HCI computing environment 100 can include an enterprise computing environment that includes hundreds or even thousands of physical machines that are positioned in racks 112 distributed geographically and connected to one another through the network 109. A virtual machine can be executed in a physical server within the racks 112. A physical server 115 can also execute more than one virtual machine. The virtual machine can represent an emulation of a physical computing device that is executed within the host machine. A hypervisor can provide access to the physical resources of the machine in which the virtual machine is executed.

The physical server 115a can also include a data store 124. The data store 124 can include memory of the physical server 115a, mass storage resources of the physical server 115a, or any other storage resources on which data can be stored by the physical server 115a. The data store 124 can include memory of the physical server 115a in some examples. The data stored in the data store 124, for example, can be associated with the operation of the various services or functional entities described below.

The components executed on the physical server 115a can include, for example, an imaging service 130 as well as other applications, services, processes, systems, engines, or functionality not discussed in detail herein. The imaging service 130 can oversee the imaging, configuration, and/or setup of the various other physical servers 115 or virtual machines that comprise the HCI computing environment 100. The imaging service 130 can image physical servers 115 or virtual machines by loading operating systems, applications, configuration files, or other data onto physical servers 115 so that they can be brought up and operational within a rack 112. To this end, the imaging service 130 can also include or execute a DHCP server 131, or DHCP server process, which can implement the DHCP protocol to provide other physical servers 115 or virtual machines that are DHCP clients 133 with network and other configuration parameters.

The DHCP server 131 can also include IP address assignment logic 140. The IP address assignment logic 140 can evaluate parameters provided by a DHCP client 133 in a DHCP broadcast message or DHCP request to determine what IP address to assign to the DHCP client 133 as well as what other configuration parameters should be assigned to the DHCP client 133 for configuration of the physical server 115*b* or virtual machine on which the DHCP client 133 is running.

The physical server 115*b* represents a machine that can be configured or imaged by the imaging service 130. The physical server 115*b* can execute a DHCP client 133 and operating system 151. In some examples, the DHCP client 133 can be a component of the operating system 151. In other examples, the DHCP client 133 can be a component of the BIOS of the physical server 1115*b*, which can facilitate initial configuration or installation of the operating system 151 with the assistance of the imaging service 130.

The DHCP client 133 can request an IP address from a DHCP server 131 on the same network 109. The DHCP server 131 executed by the imaging service 130 can assign an IP address to the DHCP client 133 based upon vendor or device identifying information that is embedded within the DHCP broadcast message received from the DHCP client 133. The vendor identifying information can comprise a DHCP vendor class identifier that is embedded within the DHCP broadcast message as an optional parameter. The vendor class identifier can identify the device type, manufacturer, and/or model number of the physical server 115 that is requesting the IP address. The vendor class identifier can also include other data from which a device type or device model can be identified by the DHCP server 131 or the IP address assignment logic 140.

The IP address assignment logic 140 can also determine other DHCP parameters that can be provided to the DHCP client 133, such as the DHCP next-server option, a DHCP TFTP server name, a DHCP bootfile name, a network location of a boot image or boot file, or any other options or parameters that are supported by the DHCP protocol. Accordingly, the IP address assignment logic 140 can include logic as well as a table or other data structure that specifies what IP address or range of IP addresses should be assigned to a particular DHCP client 133 based upon the vendor identifying information in the DHCP broadcast message received from the client.

The data store 124 can include an IP address cache 141 that can cache IP addresses assigned to physical servers 115 or virtual machines. The IP address cache 141 can be a persistent cache or storage resource. The IP address cache 141 can associate an IP address assigned by the IP address assignment logic 140 to a particular physical server 115 or virtual machine with a media access control (MAC) address of the physical server 115 or virtual machine. The MAC address can be extracted from the DHCP broadcast message received from the corresponding DHCP client 133 that the IP address assignment logic 140 processed to assign the IP address. The IP address cache 141 can also include the additional parameters that were provided to the DHCP client 133 through a subsequent DHCP offer message.

By caching the IP address as well as the additional parameters provided to the DHCP client 133, the IP address assignment logic 140 need only be executed once per physical server 115 or virtual machine that is configured by the imaging service 130. Or, the IP address assignment logic 140 need only be executed once per physical server 115 or virtual machine until the IP address cache 141 is cleared or an entry corresponding to the physical server 115 or virtual machine is deleted. In many examples of this disclosure, this framework can result in the IP address assignment logic 140 requiring execution only when the rack 112 is initially deployed in a data center and when the physical servers 115 in the rack 112 are powered up. As a result, the performance of the imaging service 130 can be improved by embodiments of this disclosure by utilizing the IP address cache 141 to speed up subsequent IP address assignments to DHCP clients 133 having a MAC address that is associated with a previous IP address assignment in the cache.

Figure 3:
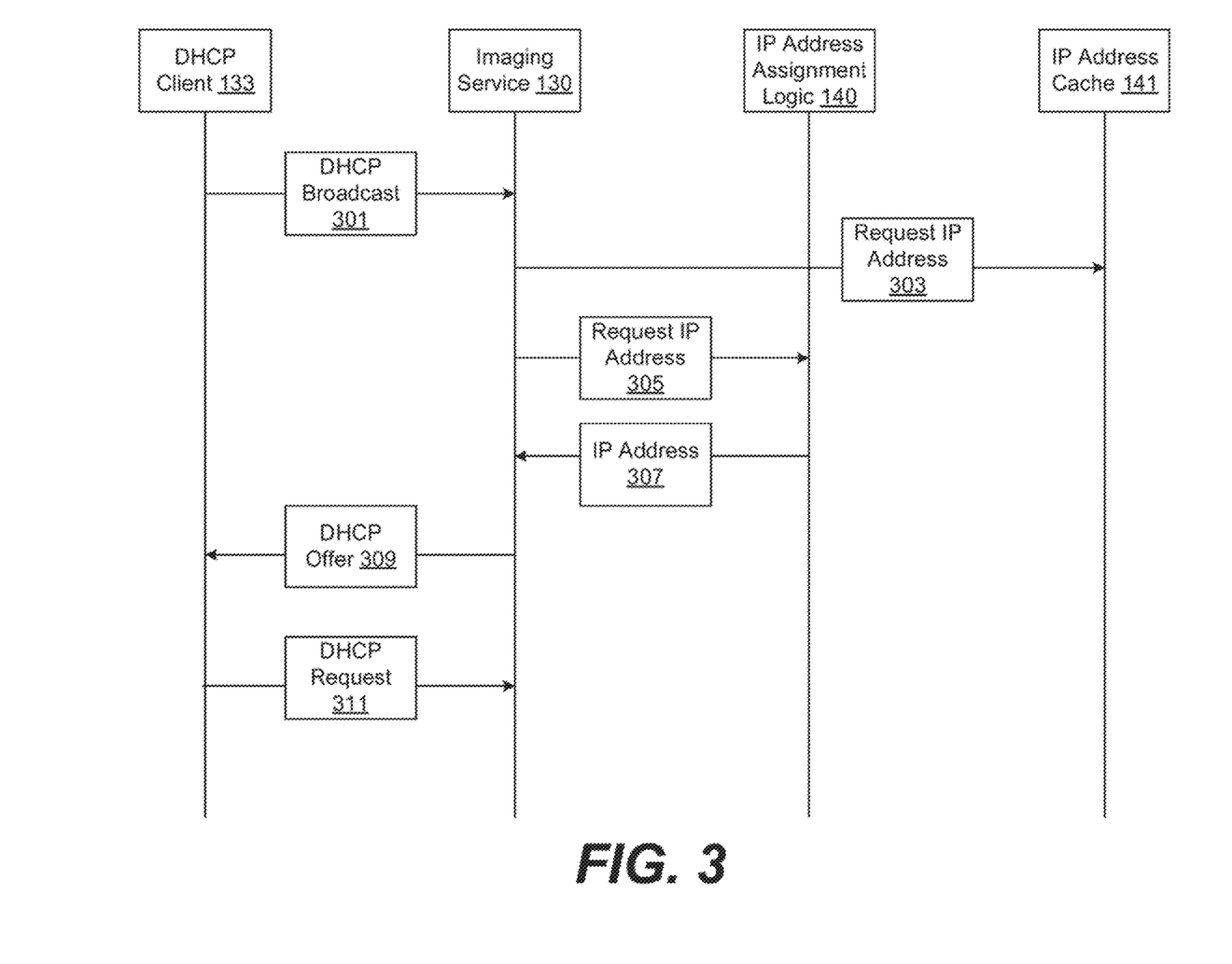
FIG. 3 is a sequence diagram showing interactions between components according to one example of the disclosure.

Referring next to FIG. 3, shown is a sequence diagram, that illustrates how the imaging service 130 can assign an IP address to a DHCP client 133 that corresponds to a physical server 115 or virtual machine. The imaging service 130 can also assign other configuration parameters through optional parameters that are supported by the DHCP protocol that facilitate configuration and/or imaging of the machine corresponding to the DHCP client 133.

First, at step 301, the DHCP client 133 sends a DHCP broadcast message on the network 109. The DHCP broadcast can be sent to a broadcast network address on the network 109 to obtained by the DHCP server 131 executed by the imaging service 130. Upon receiving the DHCP broadcast message, the imaging service 130 can extract a MAC address from the message, which corresponds to the MAC address of the machine executing the DHCP client 133.

Next, at step 303, the imaging service can request an IP address as well as any additional configuration parameters that are to be provided to the DHCP client 133 from the IP address cache 141. In the scenario depicted in FIG. 3, the machine, corresponding to the DHCP client 133 has not been configured by the imaging service 130, so there is no entry in the cache that corresponds to its MAC address.

Next, at step 305, the imaging service 130 can request the IP address and other configuration parameters to be provided to the DHCP client 133 from the IP address assignment logic 140. The IP address assignment logic 140 can assign an IP address and generate the other configuration parameters for the DHCP client 133 based upon the vendor identifying information that is extracted from the DHCP broadcast message. The IP address assignment logic 140 can require the imaging service 130 to consult one or more data structures or obtain a free IP address from a pool of unassigned IP addresses that are taken from an appropriate IP address range for the DHCP client 133.

At step 307, the IP address assignment logic 140 can provide the IP address and other configuration parameters to the imaging service 130.

At step 309, the imaging service 130, through the DHCP server 131 functionality of the imaging service 130, can provide a DHCP offer message according to the DHCP protocol to the DHCP client 133. The DHCP client 133 can include the IP address assigned by the IP address assignment logic 140 as well as the other configuration parameters, such as next-book, PXE, TFTP, and other DHCP options that ran be provided in the DHCP offer message.

At step 311, if the DHCP client 133 accepts the DHCP offer according to the DHCP protocol, the DHCP client can send a DHCP request message to the imaging service 130 or the DHCP server 131 implemented by the imaging service 130. In some implementations, the imaging service 130 can then provide a DHCP acknowledgement message in reply to the DHCP request 311 to complete the DHCP exchange between the DHCP client 113 and DHCP server 131.

Figure 4:
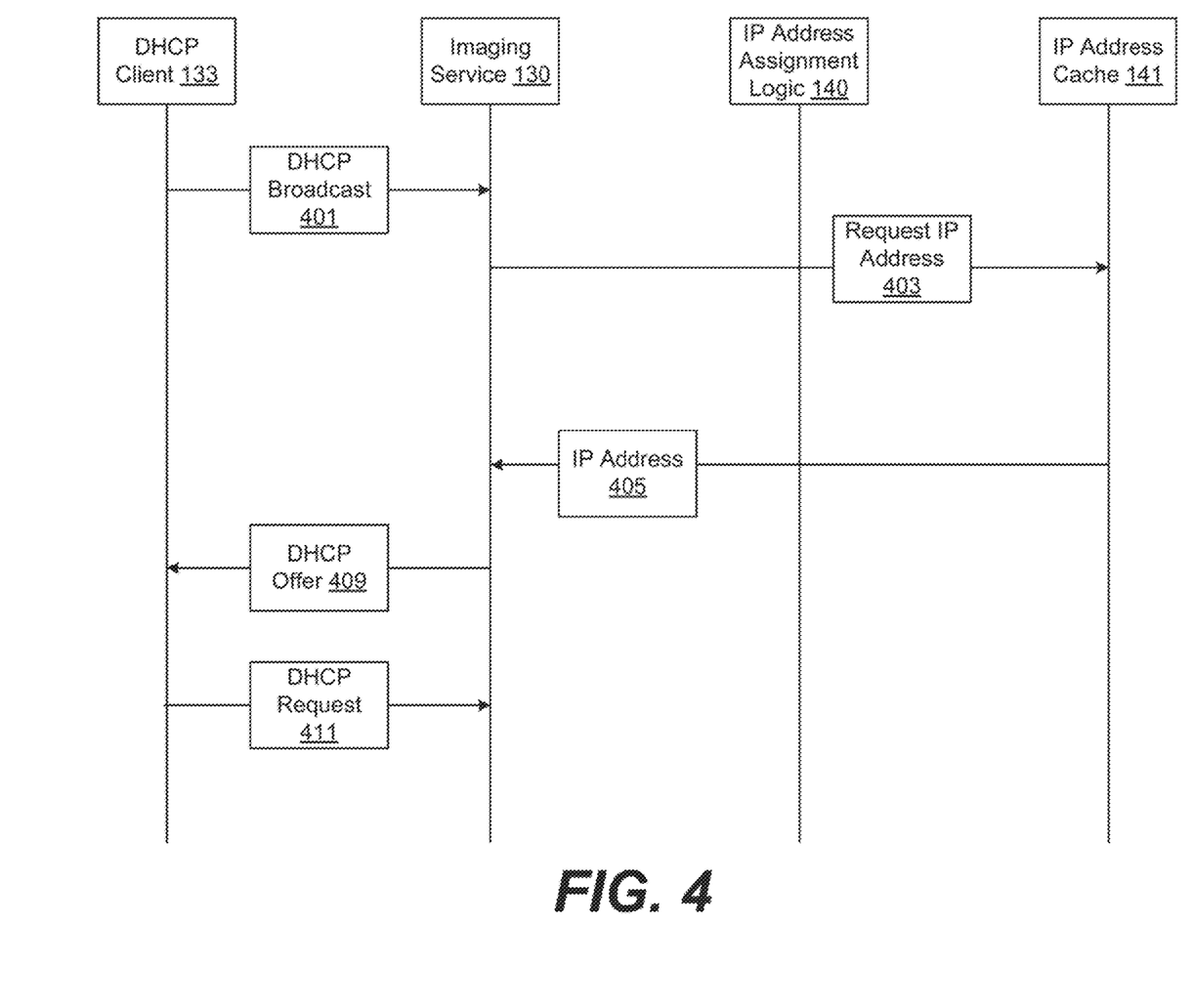
FIG. 4 is a sequence diagram showing interactions between components according to one example of the disclosure.

Referring next to FIG. 4, shown is a sequence diagram that illustrates how the imaging service 130 can assign an IP address to a DHCP client 133 that corresponds to a physical server 115 or virtual machine when the IP address and/or other configuration parameters are cached in the IP address cache 141.

First, at step 401, the DHCP client 133 sends a DHCP broadcast message on the network 109. The DHCP broadcast can be sent to a broadcast network address on the network 109 to obtained by the DHCP server 131 executed by the imaging service 130. Upon receiving the DHCP broadcast message, the imaging service 130 can extract a MAC address from the message, which corresponds to the MAC address of the machine executing the DHCP client 133.

Next, at step 403, the imaging service can request an IP address as well as any additional configuration parameters that are to be provided to the DHCP client 133 from the IP address cache 141. In the scenario depicted in FIG. 4, the machine corresponding to the DHCP client 133 has been previously configured by the imaging service 130, so there is an entry in the cache that corresponds to its MAC address.

Next, at step 405, the imaging service 130 can obtain the IP address and other configuration parameters to be provided to the DHCP client 133 tarn the IP address cache 141. Because the imaging service 130 has previously configured the DHCP client 133 and cached the assigned IP address and configuration parameters, there is no need to execute the IP address assignment logic 140 again for the DHCP client 133.

At step 409, the imaging service 130, through the DHCP server 131 functionality of the imaging service 130, can provide a DHCP offer message according to the DHCP protocol to the DHCP client 133. The DHCP client 133 can include the IP address retrieved from the IP address cache 141 as well as the other configuration parameters, such as next-book, PXE, TFTP, and other DHCP options that can be provided in the DHCP offer message.

At step 411, if the DHCP client 133 accepts the DHCP offer according to the DHCP protocol, the DHCP client can send a DHCP request message to the imaging service 130 or the DHCP server 131 implemented by the imaging service 130. In some implementations, the imaging service 130 can then provide a DHCP acknowledgement message in reply to the DHCP request 311 to complete the DHCP exchange between the DHCP client 133 and DHCP server 131.

Figure 5:
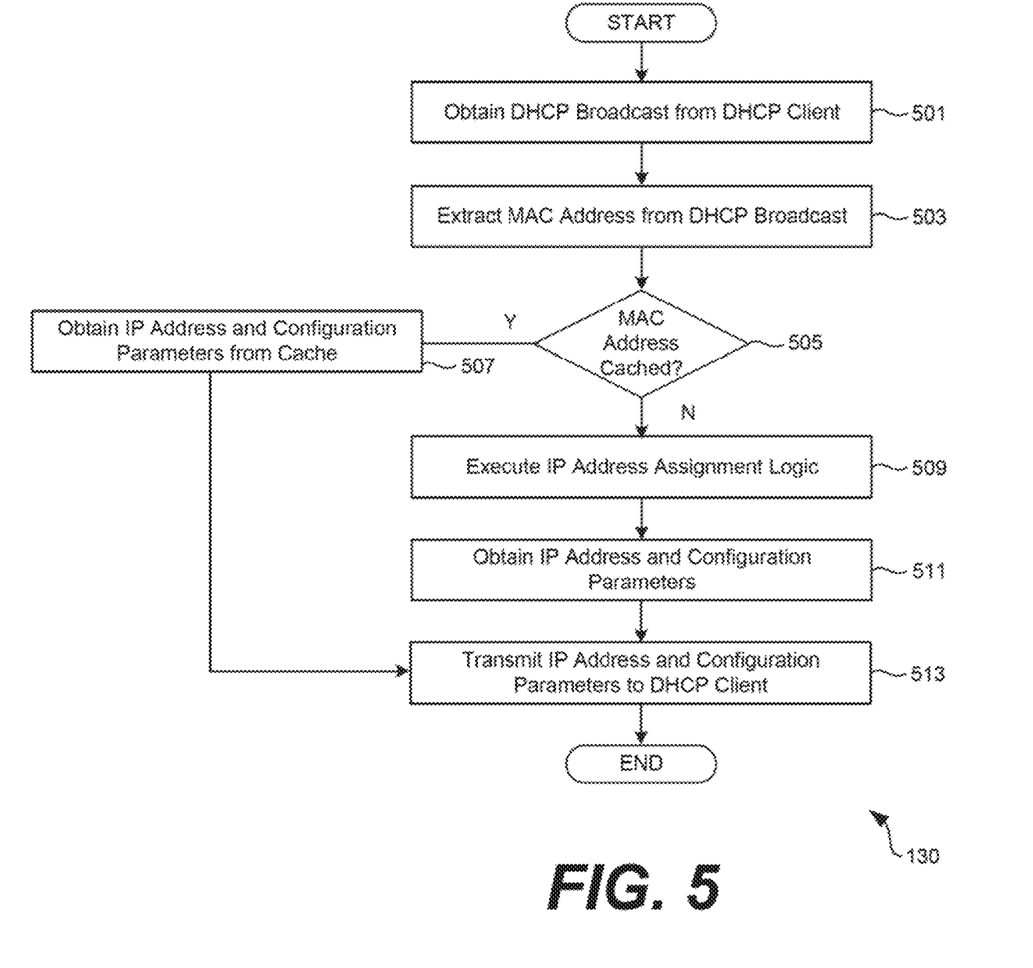
FIG. 5 is a flowchart illustrating functionality implemented by components of the networked environment.

Moving on to FIG. 5, shown is a flowchart that provides one example of the operation of a portion of the imaging service 130. The flowchart of FIG. 6 can be viewed as depicting an example of elements of a method implemented by the imaging service 130 according to one or more examples. The separation or segmentation of functionality as discussed herein is presented for illustrative purposes only.

Beginning with step 501, the imaging service 130 can obtain a DHCP broadcast message from a DHCP client 133. The DHCP broadcast can be sent to a broadcast network address on the network 109 to obtained by the DHCP server 131 executed by the imaging service 130. In some implementations, the imaging service 130 can implement a multi-threaded DHCP server 131 that can process multiple DHCP broadcast messages at once that might be arriving from multiple DHCP clients 133 at once.

Upon receiving the DHCP broadcast message, the imaging service 130 can extract a MAC address from the message, which corresponds to the MAC address of the machine executing the DHCP client 133 at step 503.

Next, at step 505, the imaging service 130 can determine whether an entry corresponding to the MAC address is present within the IP address cache 141. If there is no entry within the IP address cache 141, the process can proceed to step 505. If there is an entry within the IP address cache 141 corresponding to the MAC address of the DHCP client 133, the process can proceed to step 507.

At step 507, the imaging service 130 can retrieve the IP address and other configuration parameters previously assigned to the MAC address from the IP address cache 141. Thereafter, the process can proceed to step 513, which is described below.

If, at step 505, there is no entry within the IP address cache 141, the imaging service 130, at step 509, can execrate the IP address assignment logic 140. The IP address assignment logic 140 can assign an IP address and generate the other configuration parameters for the DHCP client 133 based upon the vendor identifying information, such as a vendor-identifier code, that can be extracted from the DHCP broadcast message. The IP address assignment logic 140 can require the imaging service 130 to consult one or more data structures or obtain a free IP address from a pool of unassigned IP addresses that are taken from an appropriate IP address range for the DHCP client 133.

At step 511, the imaging service 130 can obtain the IP address and other configuration parameters generated by the IP address assignment logic 140.

At step 513, the imaging service 130, through the DHCP server 131 functionality of the imaging service 130, can provide a DHCP offer message according to the DHCP protocol to the DHCP client 133. The DHCP client 133 can include the IP address assigned by the IP address assignment logic 140 as well as the other configuration parameters, such as next-book, PXE, TFTP, and other DHCP options that can be provided in the DHCP offer message. In some implementations, the imaging service 130 can subsequently obtain a DHCP request message from the DHCP client 133 if the DHCP client 133 accepts the DHCP offer according to the DHCP protocol. The imaging service 130 can also provide a DHCP acknowledgement message in reply to the DHCP request 311 to complete the DHCP exchange between the DHCP client 133 and DHCP server 131. Thereafter, the process proceeds to completion.

The physical servers 115 or other deices comprising the HCI computing environment 100 can include at least one processor circuit, for example, having at least one hardware processor and at least one physical memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. A data store 124 and other data can also be stored in the memory.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, a magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the imaging service 130. These client devices can include a display upon which a user interface generated by a client application can be rendered. In some examples, the user interface can be generated using user interface data provided by the HCI computing environment 100. The client device can also include one or more input/output devices that can include, for example, a capacitive touchscreen or other type of touch input device, fingerprint reader, or keyboard.

Although the imaging service 130 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted fro the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks show in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from die spirit and principles of the disclosure. All such modifications and variations are intended to be included herein within the scope of this disclosure.

What is claimed is:

1. A non-transitory computer-readable medium embodying program code executable in at least one computing device that, when executed by the at least one computing device, causes the at least one computing device to:
   initiate a server process that listens for DHCP broadcast messages on a local area network (LAN);
   obtain a DHCP discovery message from a DHCP client on the local area network, the DHCP discovery message comprising vendor identifying information;
   identify, based upon the vendor identifying information, a particular internet protocol (IP) address to assign to the DHCP client by executing IP address assignment logic;
   identify, based upon the vendor identifying information, at least one additional parameter to provide to the DHCP client;
   associate the particular IP address with a media access control (MAC) address of the DHCP client;
   generate a DHCP offer message comprising the particular IP address and the at least one additional parameter;
   transmit the DHCP offer message to the DHCP client;
   receive a subsequent DHCP discovery message;
   determine whether a MAC address embedded within the subsequent DHCP discovery message was previously associated with the particular IP address; and
   generate a subsequent DHCP offer message without executing the IP address assignment logic, wherein the subsequent DHCP offer message comprises the particular IP address and the at least one additional parameter.

2. The non-transitory computer-readable medium of claim 1, wherein the vendor identifying information further comprises a vendor class identifier field embedded within the DHCP discovery message.

3. The non-transitory computer-readable medium of claim 1, wherein the at least one additional parameter comprises a DHCP next server parameter or a network location of a trivial file transfer protocol (TFTP) server.

4. The non-transitory computer-readable medium of claim 1, wherein the particular IP address is associated with the MAC address of the DHCP client in a persistent cache accessible to the at least one of the at least one computing device.

5. The non-transitory computer-readable medium of claim 1, wherein IP address assignment logic determines the particular IP address from an IP address range associated with the vendor identifying information.

6. The non-transitory computer-readable medium of claim 1, wherein the program code further causes the at least one computing device to generate a DHCP acknowledgement in response to receiving a DHCP request message subsequent to the DHCP offer message from the DHCP client.

7. A hyper-converged infrastructure (HCI) rack, comprising:
at least one network switch;
a plurality of physical servers installed in the HCI rack, the plurality of physical servers in communication using the network switch;
a dynamic host configuration protocol (DHCP) server process executed by at least one of the plurality of physical servers within the rack, the DHCP server process causing the at least one of the plurality of physical servers to:
  initiate a server process that listens for DHCP broadcast messages on a local area network (LAN);
  obtain a DHCP discovery message from a DHCP client on the local area network, the DHCP discovery message comprising vendor identifying information;
  identify, based upon the vendor identifying information, a particular internet protocol (IP) address to assign to the DHCP client by executing IP address assignment logic;
  identify, based upon the vendor identifying information, at least one additional parameter to provide to the DHCP client;
  associate the particular IP address with a media access control (MAC) address of the DHCP client;
  generate a DHCP offer message comprising the particular IP address and the at least one additional parameter;
  transmit the DHCP offer message to the DHCP client;
  receive a subsequent DHCP discovery message;
  determine whether a MAC address embedded within the subsequent DHCP discovery message was previously associated with the particular IP address; and
  generate a subsequent DHCP offer message without executing the IP address assignment logic, wherein the subsequent DHCP offer message comprises the particular IP address and the at least one additional parameter.

8. The HCI rack of claim 7, wherein the vendor identifying information further comprises a vendor class identifier field the DHCP discovery message.

9. The HCI rack of claim 7, wherein the at least one additional parameter comprises a DHCP next server parameter or a network location of a trivial file transfer protocol (TFTP) server.

10. The HCI rack of claim 7, wherein the particular IP address is associated with the MAC address of the DHCP client in a persistent cache accessible to the at least one of the plurality of physical servers.

11. The HCI rack of claim 7, wherein IP address assignment logic determines the particular IP address from an IP address range associated with the vendor identifying information.

12. The HCI rack of claim 7, wherein the DHCP server process generates a DHCP acknowledgement in response to receiving a DHCP request message subsequent to the DHCP offer message from the DHCP client.

13. A computer-implemented method, comprising:
initiating a server process that listens for DHCP broadcast messages on a local area network (LAN);
obtaining a DHCP discovery message from a DHCP client on the local area network, the DHCP discovery message comprising vendor identifying information;
identifying, based upon the vendor identifying information, a particular internet protocol (IP) address to assign to the DHCP client by executing IP address assignment logic;
identifying, based upon the vendor identifying information, at least one additional parameter to provide to the DHCP client;
associating the particular IP address with a media access control (MAC) address of the DHCP client;
generating a DHCP offer message comprising the particular IP address and the at least one additional parameter;
transmitting the DHCP offer message to the DHCP client;
receiving a subsequent DHCP discovery message;
determining whether a MAC address embedded within the subsequent DHCP discovery message was previously associated with the particular IP address; and
generating a subsequent DHCP offer message without executing the IP address assignment logic, wherein the subsequent DHCP offer message comprises the particular IP address and the at least one additional parameter.

14. The computer-implemented method of claim 13, wherein the vendor identifying information further comprises a vendor class identifier field the DHCP discovery message.

15. The computer-implemented method of claim 13, wherein the at least one additional parameter comprises a DHCP next server parameter or a network location of a trivial file transfer protocol (TFTP) server.

16. The computer-implemented method of claim 13, wherein the particular IP address is associated with the MAC address of the DHCP client in a persistent cache.

17. The computer-implemented method of claim 13, wherein IP address assignment logic determines the particular IP address from an IP address range associated with the vendor identifying information.

* * * * *